US012337369B2

(12) United States Patent
Breen et al.

(10) Patent No.: US 12,337,369 B2
(45) Date of Patent: Jun. 24, 2025

(54) GUIDE PIN CONNECTION

(71) Applicant: STANDARD LIFTERS, INC., Grand Rapids, MI (US)

(72) Inventors: Scott M. Breen, Ada, MI (US); Joel T. Pyper, Holland, MI (US)

(73) Assignee: STANDARD LIFTERS, INC., Grand Rapids, MI (US)

( * ) Notice: Subject to any disclaimer, the term of this patent is extended or adjusted under 35 U.S.C. 154(b) by 1039 days.

(21) Appl. No.: 17/352,536

(22) Filed: Jun. 21, 2021

(65) Prior Publication Data

US 2021/0402455 A1 Dec. 30, 2021

Related U.S. Application Data

(60) Provisional application No. 63/045,456, filed on Jun. 29, 2020.

(51) Int. Cl.
*B21J 13/02* (2006.01)
*B21D 37/12* (2006.01)
*B23P 15/24* (2006.01)

(52) U.S. Cl.
CPC ............ *B21D 37/12* (2013.01); *B21J 13/02* (2013.01); *B23P 15/24* (2013.01)

(58) Field of Classification Search
CPC ...... F16B 21/165; F16B 21/18; F16B 5/0642; F16B 2/08; B23P 15/24; B21D 37/04; B21D 37/08; B21D 37/10; B21D 37/12; B21J 13/02; B21K 5/20
See application file for complete search history.

(56) References Cited

U.S. PATENT DOCUMENTS

| | | | |
|---|---|---|---|
| 2,487,233 A | 11/1949 | Gerke | |
| 2,663,180 A | 12/1953 | Benedict | |
| 3,030,677 A * | 4/1962 | Kindt | B22C 21/10 |
| | | | 279/23.1 |
| 3,126,922 A | 3/1964 | Randlet et al. | |
| 3,130,765 A * | 4/1964 | Neuschotz | F16B 37/122 |
| | | | 411/968 |
| 3,190,703 A | 6/1965 | Thomson et al. | |
| 3,326,580 A * | 6/1967 | Munier | F16L 37/088 |
| | | | 403/243 |
| 3,474,656 A | 10/1969 | Kraft | |
| 3,514,166 A | 5/1970 | Coley | |
| 3,995,360 A * | 12/1976 | Millheiser | B25B 27/20 |
| | | | 29/451 |
| 4,036,056 A | 7/1977 | Saunders | |
| 4,135,770 A | 1/1979 | Doherty et al. | |
| 4,199,313 A | 4/1980 | Bohnenberger | |
| 4,240,314 A * | 12/1980 | Teeslink | B21D 28/34 |
| | | | 83/552 |
| 4,483,173 A | 11/1984 | Duhamel | |
| 4,696,180 A | 9/1987 | Zandel | |

(Continued)

*Primary Examiner* — Daniel J Wiley
(74) *Attorney, Agent, or Firm* — PRICE HENEVELD LLP (57) ABSTRACT

A guide pin assembly includes a guide pin body that connects to a die component using retaining rings. The guide pin assembly has an upper and a lower retaining ring that permits the retention of the guide pin body in a hole in a component of a metal forming die, with each retaining ring contacting a surface of the die component. The guide pin body includes an opening to permit the temporary insertion of a device for positioning the guide pin body within the opening in the die member.

11 Claims, 6 Drawing Sheets

(56) References Cited

U.S. PATENT DOCUMENTS

| | | | |
|---|---|---|---|
| 4,732,033 A | 3/1988 | Smedberg et al. | |
| 4,742,746 A | 5/1988 | Olsson | |
| 4,796,460 A | 1/1989 | Smedberg et al. | |
| 4,900,017 A | 2/1990 | Bold, Jr. | |
| 4,926,563 A | 5/1990 | Smith | |
| RE33,940 E | 5/1992 | Matsuo | |
| 5,113,736 A | 5/1992 | Meyerle | |
| 5,245,904 A | 9/1993 | Meyerle | |
| 5,328,276 A | 7/1994 | Linteau | |
| 5,345,904 A | 9/1994 | Dopson et al. | |
| 5,397,135 A | 3/1995 | Smith | |
| 5,722,280 A | 3/1998 | Bodnar | |
| 5,758,374 A | 6/1998 | Ronci | |
| 5,788,903 A * | 8/1998 | Allgaier | F16C 29/02 264/262 |
| 6,095,736 A * | 8/2000 | Miller | F16B 41/002 411/352 |
| 6,220,946 B1 | 4/2001 | Arnold | |
| 6,408,728 B1 | 6/2002 | Tsuji et al. | |
| 6,755,104 B2 * | 6/2004 | Grant | B21D 45/006 411/140 |
| 6,848,290 B2 | 2/2005 | Pyper et al. | |
| 6,925,922 B2 | 8/2005 | Manabe et al. | |
| 6,986,273 B2 | 1/2006 | Rager | |
| 7,000,446 B2 | 2/2006 | Nieschulz et al. | |
| 7,001,173 B1 * | 2/2006 | Chu | B29C 33/303 384/49 |
| 7,004,007 B2 | 2/2006 | Kruger et al. | |
| 7,114,365 B2 | 10/2006 | Rooney, Jr. et al. | |
| 7,152,451 B1 | 12/2006 | Cotter | |
| 7,326,092 B2 | 2/2008 | Fedder et al. | |
| 7,730,757 B2 | 6/2010 | Pyper et al. | |
| 7,861,569 B2 * | 1/2011 | Cotter | B21D 24/02 72/405.06 |
| 7,950,262 B2 | 5/2011 | Pyper et al. | |
| 8,074,486 B1 | 12/2011 | Pyper et al. | |
| 8,074,515 B2 | 12/2011 | Van Kann et al. | |
| 8,151,619 B2 * | 4/2012 | Pyper | B21D 37/02 72/344 |
| 8,291,603 B2 | 10/2012 | Saegesser et al. | |
| 8,567,227 B2 | 10/2013 | Cotter | |
| 8,616,038 B2 | 12/2013 | Breen et al. | |
| 8,733,147 B2 * | 5/2014 | Breen | B21D 37/08 72/481.6 |
| 8,939,005 B2 * | 1/2015 | Breen | B21K 1/76 72/456 |
| 9,248,491 B2 * | 2/2016 | Breen | B23P 15/24 |
| 9,259,809 B2 | 2/2016 | Pyper et al. | |
| 9,302,311 B2 * | 4/2016 | Pyper | B21D 53/30 |
| 9,776,233 B2 | 10/2017 | Breen et al. | |
| 10,099,270 B2 | 10/2018 | Pyper et al. | |
| 10,639,701 B2 | 5/2020 | Breen et al. | |
| 10,954,984 B2 * | 3/2021 | Breen | F16B 21/18 |
| 11,344,943 B2 * | 5/2022 | Breen | B21D 37/12 |
| 11,504,759 B2 * | 11/2022 | Miftari | B21D 37/12 |
| 2003/0193865 A1 | 10/2003 | Chiang et al. | |
| 2004/0028504 A1 * | 2/2004 | Jakubowski, Jr. | F16B 21/18 411/517 |
| 2004/0069041 A1 * | 4/2004 | Pyper | B21D 35/00 72/405.06 |
| 2009/0193865 A1 * | 8/2009 | Pyper | B21D 37/02 72/481.3 |
| 2011/0142565 A1 * | 6/2011 | Pudvah | F16B 41/002 411/107 |
| 2011/0192206 A1 * | 8/2011 | Cotter | F16C 29/02 72/60 |
| 2011/0296893 A1 | 12/2011 | Breen et al. | |
| 2011/0302988 A1 | 12/2011 | Breen et al. | |
| 2012/0055224 A1 * | 3/2012 | Breen | B21D 37/12 72/362 |
| 2012/0055226 A1 | 3/2012 | Breen et al. | |
| 2012/0151984 A1 * | 6/2012 | Breen | B21D 37/08 72/462 |
| 2012/0210766 A1 * | 8/2012 | Breen | B21D 37/14 72/470 |
| 2014/0013816 A1 * | 1/2014 | Breen | B21K 1/76 29/428 |
| 2014/0056668 A1 * | 2/2014 | Demmeler | F16B 19/109 411/353 |
| 2015/0196947 A1 * | 7/2015 | Pyper | B21D 37/12 29/525.01 |
| 2021/0023604 A1 * | 1/2021 | Latouf | B21D 28/04 |
| 2021/0033134 A1 * | 2/2021 | Breen | F16B 21/18 |

* cited by examiner

GUIDE PIN CONNECTION

CROSS REFERENCE TO RELATED APPLICATION

Applicant hereby claims the priority benefits under the provisions of 35 U.S.C. § 119, basing said claim of priority on related U.S. Provisional Application No. 63/045,456 filed Jun. 29, 2020, which is incorporated in its entirety herein by reference.

FIELD OF THE INVENTION

The present invention relates to metal forming dies and the like and, in particular, to a guide pin connection in a through hole using retaining ring(s).

BACKGROUND OF THE INVENTION

Metal forming dies, such as stamping dies and the like are well known in the art. Progressive metal forming dies are unique, very sophisticated mechanisms which have multiple stations or progressions that are aligned longitudinally, and are designed to perform a specified operation at each station in a predetermined sequence to create a finished metal part. Progressive stamping dies are capable of forming complex metal parts at very high speeds, so as to minimize manufacturing costs.

Heretofore, the dies used in metal forming presses have typically been individually designed, one of a kind assemblies for a particular part, with each of the various components being handcrafted and custom mounted or fitted in an associated die set, which is in turn positioned in a stamping press. Not only are the punches and other forming tools in the die set individually designed and constructed, but the other parts of the die set, such as stock lifters, guides, end caps and keepers, cam returns, etc., are also custom designed and individually installed in the die set. Current die making processes require careful machining, precision holes and recesses in the die set for mounting the individual components, such that the same are quite labor intensive, and require substantial lead time to make, test and set up in a stamping press. Consequently, such metal forming dies are very expensive to design, manufacture and repair or modify.

Recently, some components for metal forming dies have been pre-constructed using a modular design that is installed in a die set as a complete unit, instead of custom making each of the component parts and assembling them in the die set. One such modular die component is Applicant's "Guided Keeper," which is the subject of U.S. Pat. Nos. 7,950,262, 8,074,486, and others, which are hereby incorporated herein by reference, and has met with substantial commercial success in reducing the overall cost of manufacturing metal forming dies. While such modular components are very advantageous, further improvements to reduce the manufacturing costs of metal forming dies generally, as well as such modular components, and improve quality and strength would clearly be advantageous. Hence, a guide pin assembly construction and associated method which simplifies the manufacturing process; simplifies the connection to die members, including rails, lifter bars, die plates, etc.; reduces the lead time and inventories; and minimizes manufacturing costs, as well as improved performance, would clearly be advantageous.

SUMMARY OF THE INVENTION

One aspect of the present invention is a guide pin assembly for attachment to a first die member in a metal forming die. The guide pin assembly includes a guide pin body having a generally cylindrical shape. The guide pin body has a first end portion configured for operable attachment with the first die member and a second end portion disposed generally opposite the first end portion. The guide pin body has a first groove that extends circumferentially about an exterior surface of the first end portion and a second groove also extends circumferentially about an exterior surface of the first end portion. The guide pin body includes a threaded central opening in a top surface of the first end portion. The guide pin assembly includes a first retainer ring closely received and retained in the first groove such that the first retainer ring contacts a first surface of the first die member. The guide pin assembly also includes a second retainer ring closely received and retained in the second groove that contacts the second surface of the first die member.

Yet another aspect of the present invention is a guide pin assembly with a generally cylindrical guide pin body. The guide pin body includes a first end portion, a second end portion disposed generally opposite the first end portion, a first groove that extends circumferentially about an exterior surface of the first end portion, and a second groove that extends circumferentially about an exterior surface of the first end portion. The guide pin body includes a threaded opening in the top surface of the first end portion. The guide pin assembly includes a first retainer ring closely received and retained in the first groove for contacting a first surface of a first die member, and a second retainer ring closely received and retained in the second groove for contacting a second surface of the first die member.

Yet another aspect of the present invention is a method of making a guide pin assembly for connecting to at least one die member. The method includes forming a guide pin body having a generally cylindrical shape. The guide pin body includes a first end portion configured for operable attachment to a first die member and a second end portion disposed generally opposite the first end portion. The guide pin body includes a first groove extending circumferentially about an exterior surface of the first end portion and a second groove spaced apart from the first groove extending circumferentially about the exterior surface of the first end portion. The guide pin body includes a threaded opening in the top surface of the first end portion. The method includes providing a second retainer ring to be closely received and retained in the second groove. The method includes coupling a threaded member to the threaded opening and moving the guide pin body into a first opening in the first die member until the second retainer ring contacts a second surface of the first die member. The method includes providing a first retainer ring to be closely received and retained in the first groove such that the first retainer ring contacts a first surface of the first die member. The method includes removing the threaded member from the threaded opening in the guide pin body.

These and other advantages of the invention will be further understood and appreciated by those skilled in the art by reference to the following written specification, claims, and appended drawings.

DETAILED DESCRIPTION OF THE PREFERRED EMBODIMENTS

For purposes of description herein, the terms "upper," "lower," "right," "left," "rear," "front," "vertical," "horizontal," and derivatives thereof shall relate to the invention as oriented in the attached drawings. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 9:
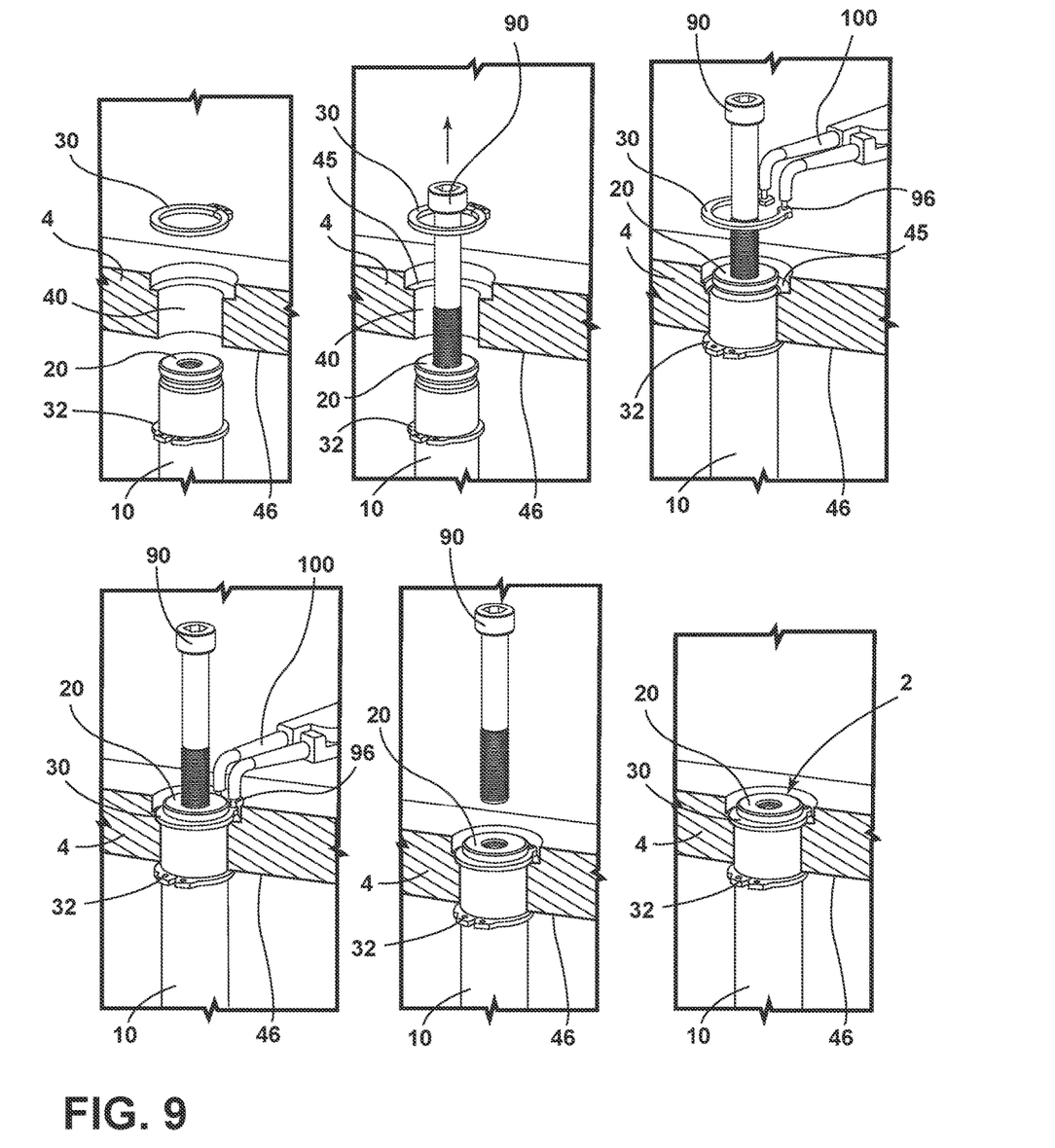
FIG. 9 is a partial front perspective view of the assembly sequence of the guide pin assembly of FIG. 1 to the first die member.
Figure 10:
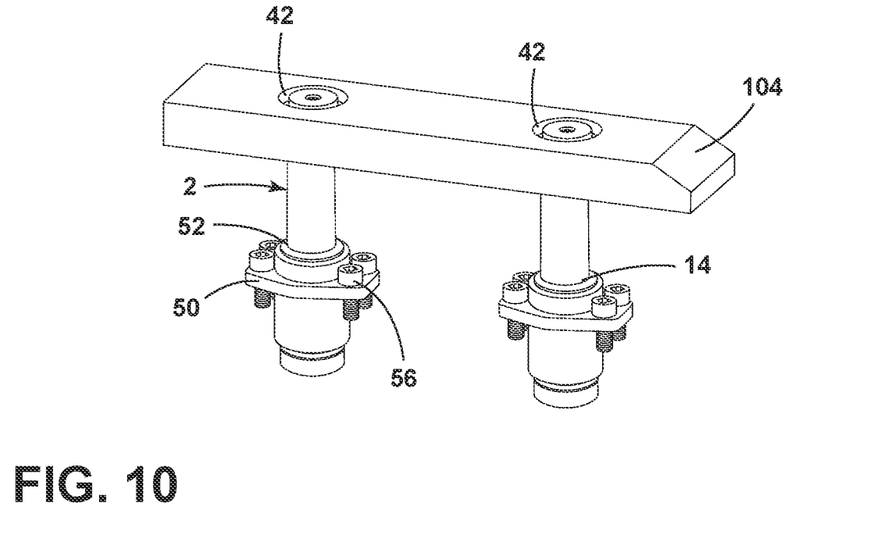
FIG. 10 is a front perspective view of a guide pin assembly according to one embodiment of the present invention being connected to a lifter rail.
Figure 11:
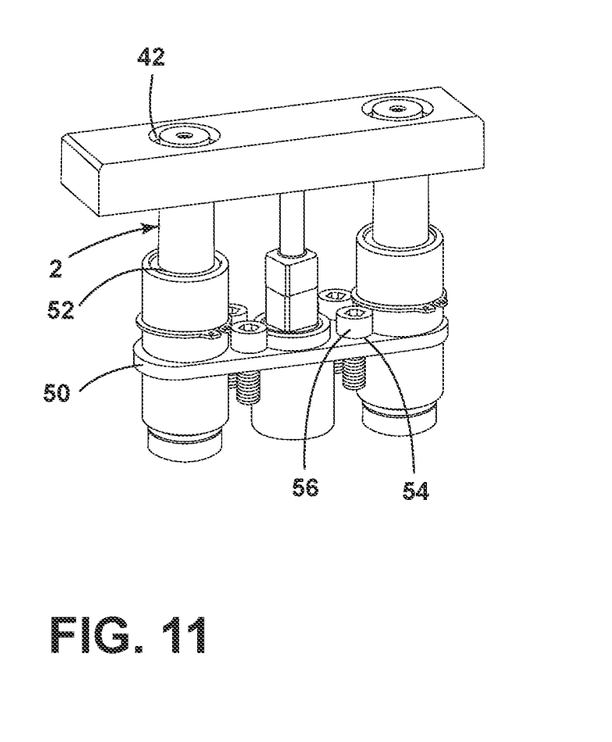
FIG. 11 is a front perspective view of another embodiment of the guide pin assembly being used as a modular lifter for a top plate.
Figure 12:
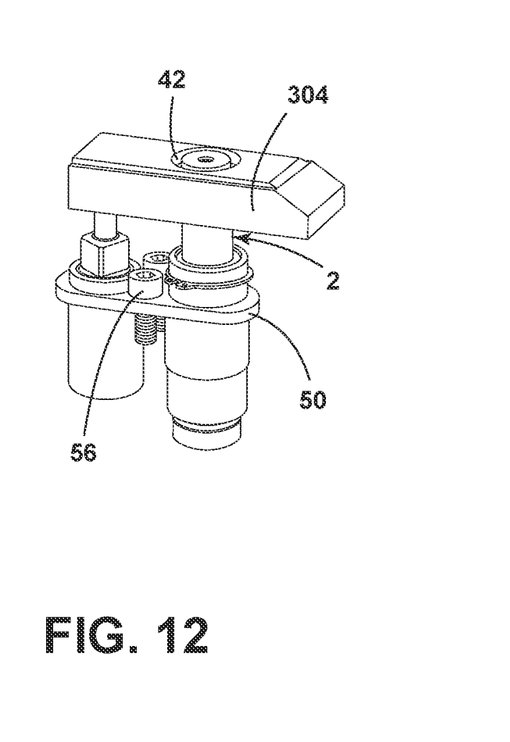
FIG. 12 is a front perspective view of another embodiment of the guide pin assembly being used as a single pin lifter.

The reference numeral 2 (FIGS. 1, 6, and 9-12) generally designates a guide pin assembly embodying one aspect of the present invention. The guide pin assembly 2 is particularly adapted for use in conjunction with metal forming dies. The guide pin assembly 2 can be connected to a first die member 4, as illustrated in FIGS. 1 and 6-9. The first die member 4 can be any component of a die assembly. For example, the first die member 4 can be a rail, lift bar, upper die member, etc. The use of the guide pin assembly 2 with some exemplary die member components is also shown in FIGS. 10-12. For example, the guide pin assembly 2 is shown as used with a lifter rail 104 with a base 50 which can be connected to a second die member (not shown) utilizing fasteners 56 which are received in fastener openings 54 in the base 50. The guide pin assembly 2 can also be used as a modular lifter for a top plate 204, as shown in FIG. 11. Again, the base 50 can be connected to a second die member (not shown). The guide pin assembly 2 can also be used as a single pin lifter, as illustrated in FIG. 12. Again, the base 50 can be connected to a second die member (not shown).

Figure 1:
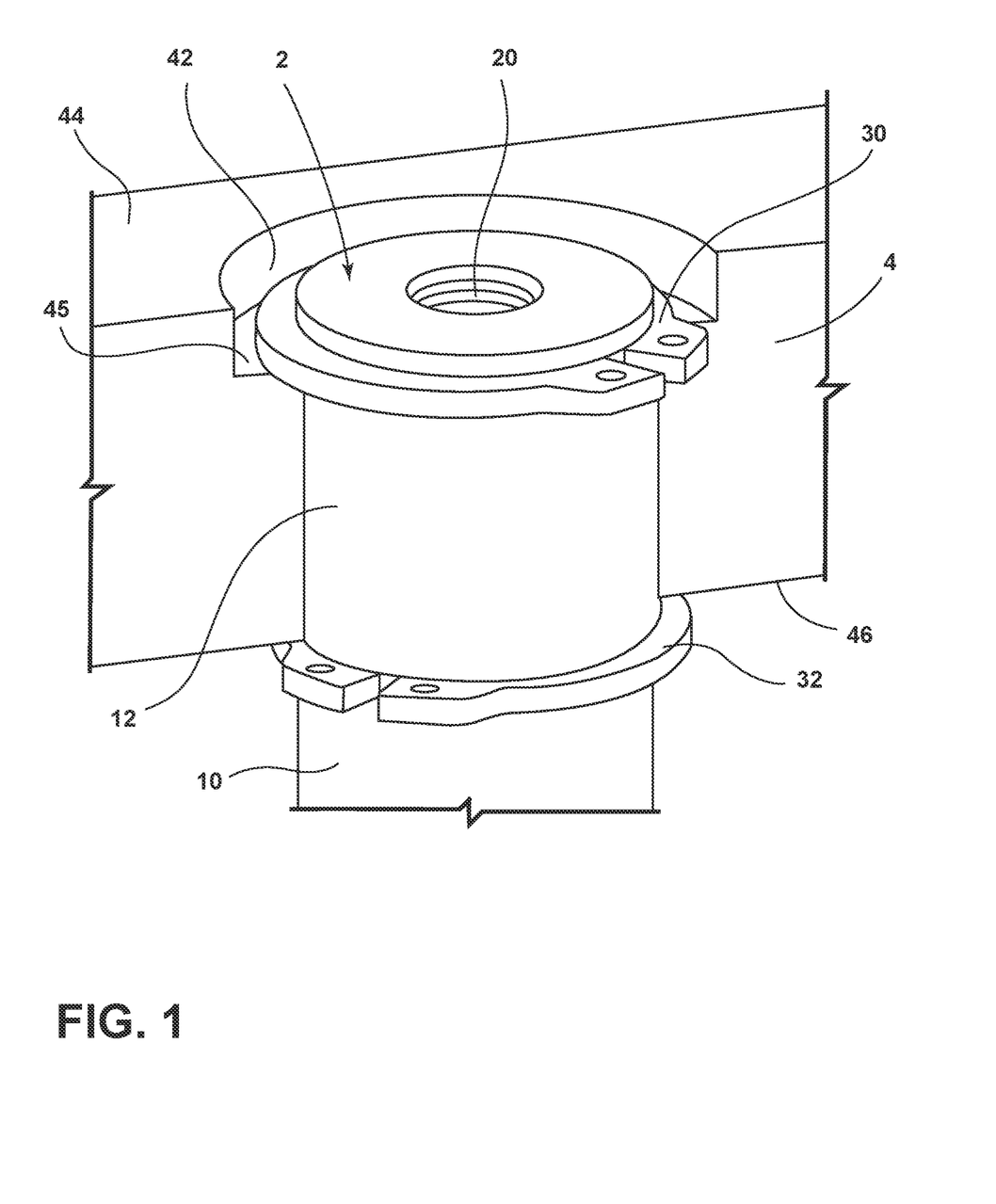
FIG. 1 is a partial perspective front view illustrating a guide pin assembly embodying one aspect of the present invention connected to a die member.
Figure 2:
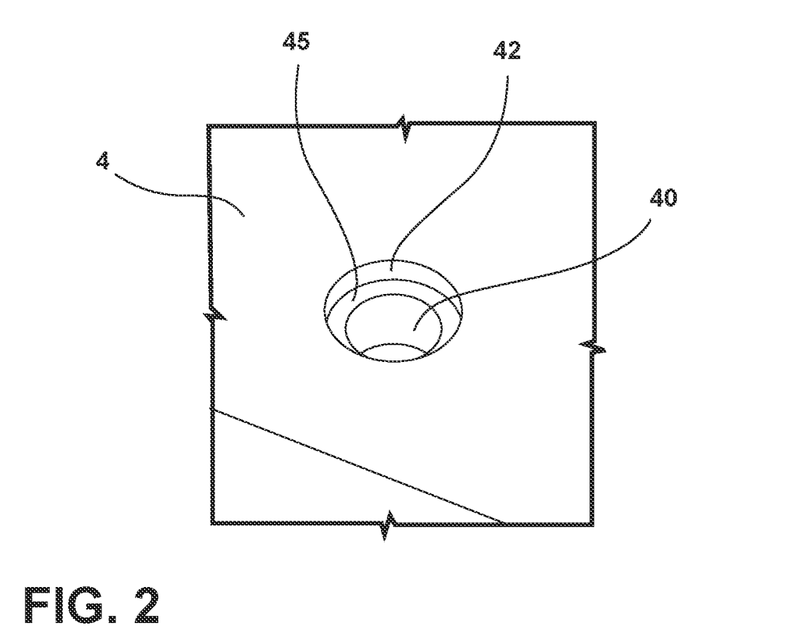
FIG. 2 is a top perspective view of the pocket formed in the first die member for receiving the guide pin assembly.
Figure 3:
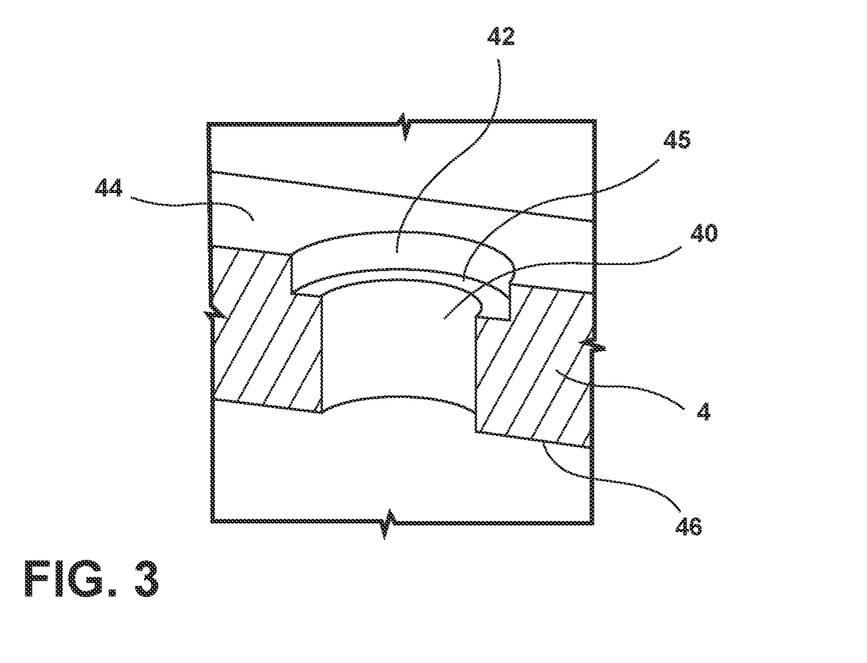
FIG. 3 is a partial front cross-sectional view of the pocket shown in FIG. 2.

The guide pin assembly 2 includes a guide pin body 10, as illustrated in FIG. 1. The guide pin body 10 includes a first end portion 12 and a second end portion 14 disposed opposite the first end portion 12. A first groove 16 is formed circumferentially on the exterior surface of the first end portion 12 of guide pin body 10. A second groove 18 is formed circumferentially on the exterior surface of the first end portion 12 of guide pin body 10. One or both of the grooves (16, 18) can be formed with a tapered surface to remove any slop of the guide pin body 10 as it is received within the opening 40 in the first die member 4. For example, in FIGS. 7-8, the first groove 16 is shown in with a tapered surface 24. The first groove 16 and the second groove 18 can have the same depth and width or could have different depths and/or widths whether or not one or both include a tapered surface.

The guide pin body 10 includes an opening 20 in the top surface 26 of the guide pin body 10. The opening 20 includes a threaded surface 22. In the illustrated embodiment, the opening 20 is located in the center of the top surface 26. However, the opening 20 could be offset. The opening 20 can couple with a fastener 90 as shown in FIG. 9. The opening 20 could also be shaped for receiving a tool for advancing the guide pin body 10 into the opening 40 in first die member 4. In these alternative arrangements, the opening 20 may not include a threaded surface 22 and could include other shapes that couple with corresponding surfaces on a tool.

The guide pin assembly 2 includes a first retainer ring 30 that is received in the first groove 16 and a second retainer ring 32 that is received in the second groove 18 of the guide pin body 10. The first retainer ring 30 will contact a first surface 45 of the first die member 4, while the second retainer ring 32 will contact a second surface 46 of the first die member 4, as illustrated in FIGS. 1 and 6-9. The first retainer ring 30 and the second retainer ring 32 can be any type of retainer ring. In addition, the first retainer ring 30 can be the same ring as the second retainer ring 32 or can be a different retainer ring. For example, the retainer rings 30, 32 can be made from different types of material, finishings, coatings, color, thickness, etc. The retainer rings 30, 32 can be made of any suitable strong and flexible material, including metal. In the illustrate examples, the first retainer ring 30 and second retainer ring 32 are split retainer rings with a generally cylindrical opening 92 on both sides of the split 94 in the retainer ring.

Figure 4:
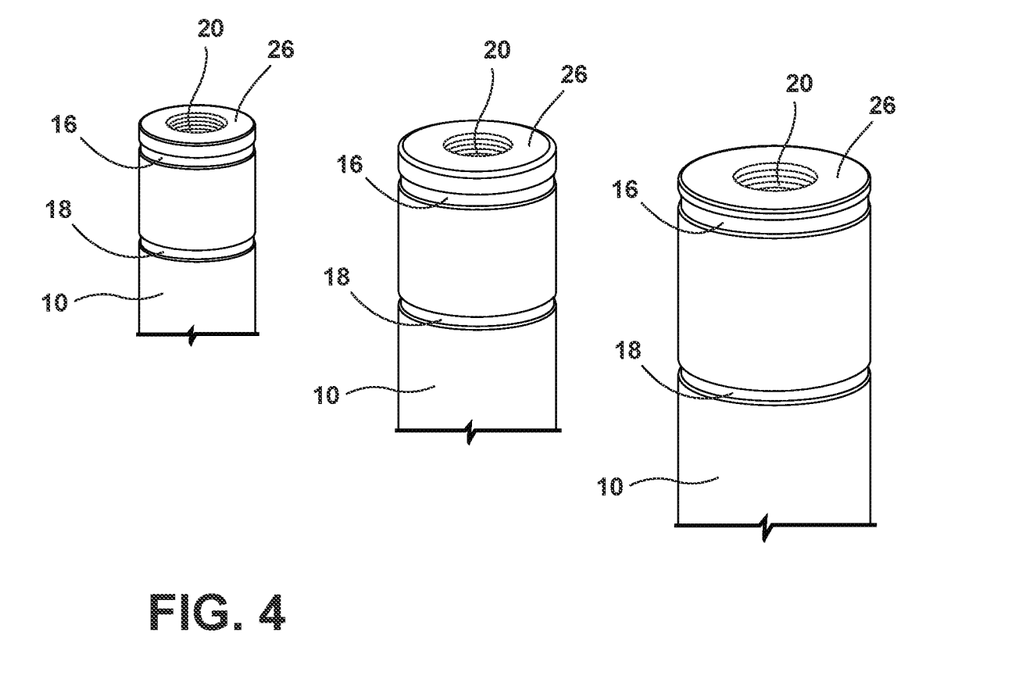
FIG. 4 is a partial front perspective view of different sizes of guide pin bodies that can be used with the guide pin assembly shown in FIG. 1.
Figure 5:
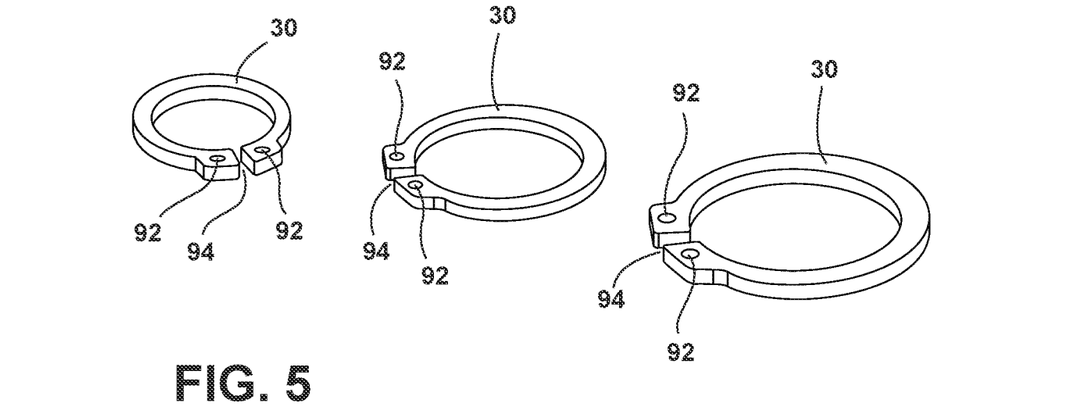
FIG. 5 is a top perspective view of retaining rings that can be used with the guide pin bodies shown in FIG. 4.
Figure 6:
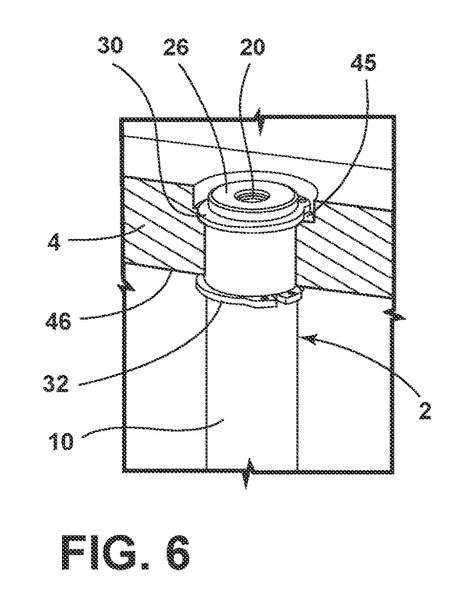
FIG. 6 is a partial front view of the guide pin body connected to a first die member, as shown in FIG. 1.
Figure 7:
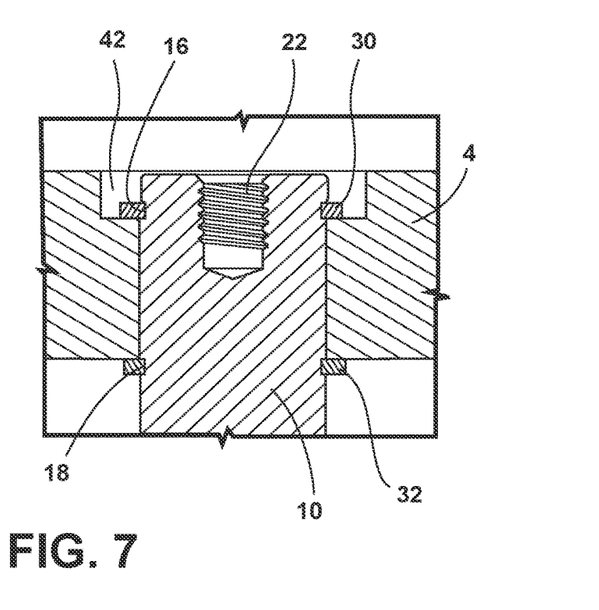
FIG. 7 is a cross-sectional view of the guide pin assembly connected to a first die member, as shown in FIGS. 1 and 6.
Figure 8:
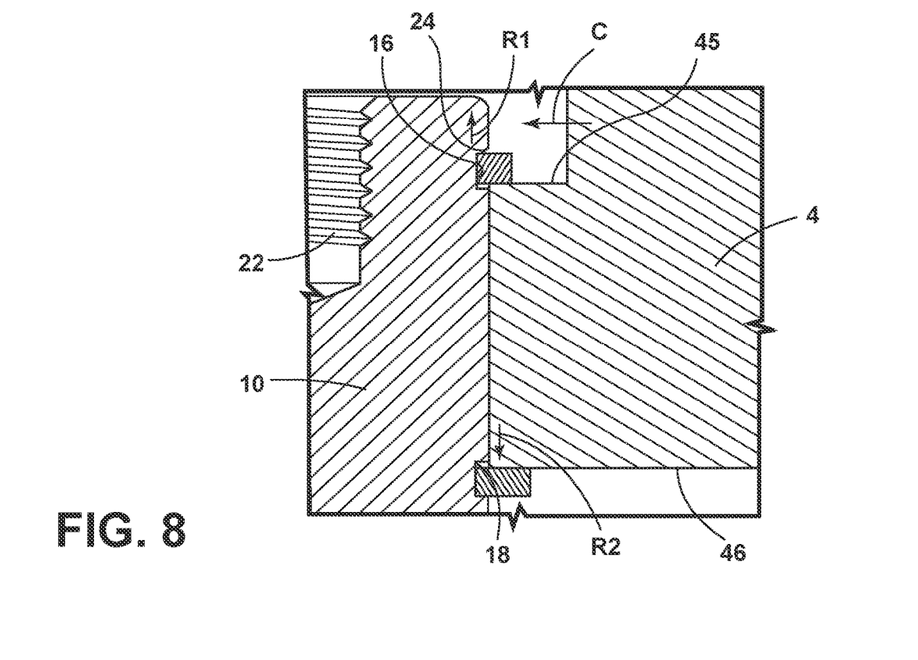
FIG. 8 is a partial front cross-sectional view of the guide pin body connected to a first die member, as shown in FIG. 7, illustrating different forces being applied to the guide pin assembly.

The guide pin body 10 can be of any length or width and is typically formed from a single piece of metal stock material, such as steel. Exemplary sizes of the guide pin body 10 are shown in FIG. 4, with the corresponding sized first retainer rings 30 illustrated in FIG. 5.

The first die member 4 has a first surface 45 and a second surface 46 that are approximately the same distance as the spacing between the first groove 16 and the second groove 18 in the guide pin body 10. A pocket 42 can be formed in the upper surface 44 of first die member 4. The pocket 42 can include an internal shoulder which acts as the first surface 45 of the first die member 4. An opening 40, which is shaped to receive the outer diameter of the guide pin body 10, extends between the first surface 45 and the second surface 46 of the first die member 4.

The method of assembling the guide pin body 10 to the first die member 4 is illustrated in FIG. 9. The method includes placing the second retainer ring 32 in the second groove 18 of the guide pin body 10. A fastener 90 is inserted into the opening 20 on the top surface 26 of the first end portion 12 of guide pin body 10. The fastener 90 is pulled upward to draw the first end portion 12 of guide pin body 10 into the opening 40 of first die member 4 until the second retainer ring 32 contacts the second surface 46 of die member 4. The first retainer ring 30 is then inserted into the first groove 16 on the first end portion 12 of guide pin body 10 such that it contacts the first surface 45 of the first die member 4. Once the first retainer ring 30 contacts the first surface 45, the guide pin assembly 2 is coupled to the first die member 4 and the fastener 90 can be removed from the opening 20 in the top surface 26 of the guide pin body 10. The first retainer ring 30 and second retainer ring 32 can be inserted utilizing a tool 100 that has tips 96 that can be received in the openings 92 in the first retainer ring 30 and/or second retainer ring 32. The tool 100 can be used to spread the openings 92 apart thereby temporarily increasing the size of the split 94 in the retainer ring (30, 32).

The clamping force C (FIG. 8) of the first retainer ring 30 on the tapered surface 24 of the first groove 16 will permit the resulting force R1, R2 to keep the guide pin assembly 2 in place and the first die member 4 secured in between the first retainer ring 30 and the second retainer ring 32.

As described above, the guide pin assembly 2 can utilize a base 50 that can be used to couple the second end portion 14 of the guide pin body 10 to a second die component. The base 50 has an opening 52 that is shaped to receive the second end portion 14 of the guide pin body 10. The base 50 can permit the reciprocation of the guide pin body 10 within the opening 52 of the base 50. This reciprocation would allow the first die member 4 and second die member to converge and diverge with respect to each other. The fasteners 56 that are received in fastener openings 54 in base 50 can be received in corresponding fastener openings in the second die member. A bushing can be used within the opening 52 in base 50 to help guide the reciprocation of the guide pin body 10 with respect to the opening 52 in base 50. The guide pin body 10 and/or base 50 can be shaped or include an attachment(s) to positively limit the travel of the guide pin body 10 within opening 52 of base 50.

While the guide pin body 10 is shown as having an exterior surface with a generally uniform diameter, the exterior surface could include tiered diameters, tapered surfaces, and/or non-cylindrical portions.

In the foregoing description, it will be readily appreciated by those skilled in the art that modifications may be made to the invention without departing from the concepts disclosed herein. Such modifications are to be considered as included in the following claims, unless these claims by their language expressly state otherwise.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

The invention is claimed as follows:

1. A guide pin assembly for attachment to a first die member in a metal forming die, comprising:
 a guide pin body having a generally cylindrical shape, including:
  a first end portion configured for operable attachment with a first die member;
  a second end portion disposed generally opposite said first end portion;
  a first groove extending circumferentially about said exterior surface of said first end portion;
  a second groove extending circumferentially about an exterior surface of said first end portion;
  a threaded central opening in the top surface of said first end portion;
 a first retainer ring closely received and retained in said first groove, contacting a first surface of said first die member;
 a second retainer ring closely received and retained in said second groove, contacting a second surface of said first die member; and wherein said first surface of said first die member is the lower surface of an opening formed in the top surface of said first die member.

2. The guide pin assembly as set forth in claim 1, wherein said first die member is a lift bar with a spaced apart base.

3. The guide pin assembly as set forth in claim 1, including a base that has a central opening shaped to receive said second end portion of said guide pin body.

4. The guide pin assembly as set forth in claim 3, wherein said base is coupled to a second die member.

5. The guide pin assembly as set forth in claim 1, wherein said first retainer ring and said second retainer ring are different retainer rings.

6. The guide pin assembly as set forth in claim 1, wherein said first groove and said second groove include at least one tapered surface.

7. A guide pin assembly comprising:
a generally cylindrical guide pin body, including:
  a first end portion;
  a second end portion disposed generally opposite said first end portion;
  a first groove extending circumferentially about an exterior surface of said first end portion;
  a second groove extending circumferentially about said exterior surface of said first end portion;
  a threaded opening in the top surface of said first end portion;
a first retainer ring closely received and retained in said first groove, contacting a first surface of a first die member;
a second retainer ring closely received and retained in said second groove, contacting a second surface of said first die member; and
wherein said first surface of said first die member is the lower surface of an opening formed in the top surface of said first die member.

8. The guide pin assembly of claim 7, wherein said first groove includes at least one tapered surface.

9. The guide pin assembly of claim 7, wherein said second groove includes at least one tapered surface.

10. The guide pin assembly of claim 7, including a base with a central opening shaped to receive said second end portion of said guide pin body.

11. The guide pin assembly of claim 10, wherein said base is coupled to a second die member.

* * * * *